US010692490B2

(12) United States Patent
Lesso et al.

(10) Patent No.: US 10,692,490 B2
(45) Date of Patent: Jun. 23, 2020

(54) DETECTION OF REPLAY ATTACK

(71) Applicant: Cirrus Logic International Semiconductor Ltd., Edinburgh (GB)

(72) Inventors: John Paul Lesso, Edinburgh (GB); César Alonso, Madrid (ES)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/050,593

(22) Filed: Jul. 31, 2018

(65) Prior Publication Data

US 2020/0043484 A1    Feb. 6, 2020

(51) Int. Cl.
| | |
|---|---|
| G10L 17/00 | (2013.01) |
| G10L 15/20 | (2006.01) |
| G06F 21/32 | (2013.01) |
| G10L 15/22 | (2006.01) |
| G10L 21/0208 | (2013.01) |
| G10L 15/06 | (2013.01) |

(52) U.S. Cl.
CPC .............. *G10L 15/20* (2013.01); *G06F 21/32* (2013.01); *G10L 15/22* (2013.01); *G10L 21/0208* (2013.01); *G10L 15/063* (2013.01)

(58) Field of Classification Search
CPC ......... G10L 17/00; G10L 17/02; G10L 17/04; G10L 17/06; G10L 17/12; G10L 17/14; G10L 17/16; G10L 17/18; G10L 17/20; G10L 17/26
USPC .................................. 704/246, 247, 249, 250
See application file for complete search history.

(56) References Cited

U.S. PATENT DOCUMENTS

| | | | |
|---|---|---|---|
| 5,197,113 A | 3/1993 | Mumolo | |
| 5,568,559 A | 10/1996 | Makino | |
| 5,787,187 A | 7/1998 | Bouchard et al. | |

(Continued)

FOREIGN PATENT DOCUMENTS

| | | |
|---|---|---|
| AU | 2015202397 B2 | 5/2015 |
| CN | 106297772 A | 1/2017 |

(Continued)

OTHER PUBLICATIONS

Zhi Hao Lim et al. ("An Investigation of Spectral Feature Partitioning for Replay Attacks Detection", APSIPA conference, pp. 1570-1573, Dec. 12-15, 2017).*

(Continued)

*Primary Examiner* — Qi Han
(74) *Attorney, Agent, or Firm* — Jackson Walker L.L.P.

(57) ABSTRACT

A method of detecting a replay attack comprises: receiving an audio signal representing speech; identifying speech content present in at least a portion of the audio signal; obtaining information about a frequency spectrum of each portion of the audio signal for which speech content is identified; and, for each portion of the audio signal for which speech content is identified: retrieving information about an expected frequency spectrum of the audio signal; comparing the frequency spectrum of portions of the audio signal for which speech content is identified with the respective expected frequency spectrum; and determining that the audio signal may result from a replay attack if a measure of a difference between the frequency spectrum of the portions of the audio signal for which speech content is identified and the respective expected frequency spectrum exceeds a threshold level.

16 Claims, 7 Drawing Sheets

(56) References Cited

U.S. PATENT DOCUMENTS

| | | | |
|---|---|---|---|
| 6,480,825 B1 | 11/2002 | Sharma et al. | |
| 7,016,833 B2 | 3/2006 | Gable et al. | |
| 7,039,951 B1 | 5/2006 | Chaudhari et al. | |
| 8,489,399 B2 | 7/2013 | Gross | |
| 8,856,541 B1* | 10/2014 | Chaudhury | G06F 21/32 |
| | | | 382/115 |
| 8,997,191 B1 | 3/2015 | Stark et al. | |
| 9,049,983 B1 | 6/2015 | Baldwin | |
| 9,171,548 B2 | 10/2015 | Velius et al. | |
| 9,430,629 B1 | 8/2016 | Ziraknejad et al. | |
| 9,484,036 B2 | 11/2016 | Kons et al. | |
| 9,646,261 B2 | 5/2017 | Agrafioti et al. | |
| 10,079,024 B1 | 9/2018 | Bhimanaik et al. | |
| 10,192,553 B1 | 1/2019 | Chenier et al. | |
| 10,334,350 B2 | 6/2019 | Petrank | |
| 2002/0194003 A1 | 12/2002 | Mozer | |
| 2003/0177007 A1 | 9/2003 | Kanazawa et al. | |
| 2004/0141418 A1 | 7/2004 | Matsuo et al. | |
| 2005/0171774 A1 | 8/2005 | Applebaum et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0233483 A1 | 10/2007 | Kuppuswamy et al. | |
| 2008/0071532 A1 | 3/2008 | Ramakrishnan et al. | |
| 2008/0262382 A1 | 10/2008 | Akkermans et al. | |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0232361 A1 | 9/2009 | Miller | |
| 2009/0319270 A1* | 12/2009 | Gross | G10L 15/22 |
| | | | 704/246 |
| 2010/0004934 A1 | 1/2010 | Hirose et al. | |
| 2010/0076770 A1 | 3/2010 | Ramaswamy | |
| 2010/0204991 A1 | 8/2010 | Ramakrishnan et al. | |
| 2010/0328033 A1 | 12/2010 | Kamei | |
| 2011/0276323 A1 | 11/2011 | Seyfetdinov | |
| 2011/0314530 A1 | 12/2011 | Donaldson | |
| 2012/0110341 A1 | 5/2012 | Beigi | |
| 2012/0323796 A1 | 12/2012 | Udani | |
| 2013/0024191 A1 | 1/2013 | Krutsch et al. | |
| 2013/0080167 A1 | 3/2013 | Mozer | |
| 2013/0279724 A1 | 10/2013 | Stafford et al. | |
| 2013/0289999 A1 | 10/2013 | Hymel | |
| 2014/0149117 A1 | 5/2014 | Bakish et al. | |
| 2014/0188770 A1 | 7/2014 | Agrafioti et al. | |
| 2015/0006163 A1 | 1/2015 | Liu et al. | |
| 2015/0088509 A1 | 3/2015 | Gimenez et al. | |
| 2015/0089616 A1 | 3/2015 | Brezinski et al. | |
| 2015/0161459 A1 | 6/2015 | Boczek | |
| 2015/0245154 A1 | 8/2015 | Dadu et al. | |
| 2015/0261944 A1 | 9/2015 | Hosom et al. | |
| 2015/0301796 A1 | 10/2015 | Visser et al. | |
| 2015/0347734 A1 | 12/2015 | Beigi | |
| 2015/0356974 A1 | 12/2015 | Tani et al. | |
| 2015/0371639 A1 | 12/2015 | Foerster et al. | |
| 2016/0026781 A1 | 1/2016 | Boczek | |
| 2016/0086609 A1 | 3/2016 | Yue et al. | |
| 2016/0125877 A1 | 5/2016 | Foerster et al. | |
| 2016/0147987 A1 | 5/2016 | Jang et al. | |
| 2016/0210407 A1 | 7/2016 | Hwang et al. | |
| 2016/0234204 A1 | 8/2016 | Rishi et al. | |
| 2016/0314790 A1 | 10/2016 | Tsujikawa et al. | |
| 2016/0324478 A1 | 11/2016 | Goldstein | |
| 2016/0330198 A1 | 11/2016 | Stern et al. | |
| 2017/0011406 A1 | 1/2017 | Tunnell et al. | |
| 2017/0049335 A1 | 2/2017 | Duddy | |
| 2017/0078780 A1 | 3/2017 | Qian et al. | |
| 2017/0112671 A1 | 4/2017 | Goldstein | |
| 2017/0116995 A1 | 4/2017 | Ady et al. | |
| 2017/0161482 A1 | 6/2017 | Eltoft et al. | |
| 2017/0169828 A1 | 6/2017 | Sachdev | |
| 2017/0200451 A1 | 7/2017 | Bocklet et al. | |
| 2017/0214687 A1 | 7/2017 | Klein et al. | |
| 2017/0231534 A1 | 8/2017 | Agassy et al. | |
| 2017/0287490 A1 | 10/2017 | Biswal et al. | |
| 2017/0347180 A1 | 11/2017 | Petrank | |
| 2017/0347348 A1 | 11/2017 | Masaki et al. | |
| 2017/0351487 A1 | 12/2017 | Aviles-Casco Vaquero et al. | |
| 2018/0039769 A1 | 2/2018 | Saunders et al. | |
| 2018/0047393 A1 | 2/2018 | Tian et al. | |
| 2018/0060557 A1* | 3/2018 | Valenti | G10L 15/06 |
| 2018/0096120 A1 | 4/2018 | Boesen | |
| 2018/0146370 A1* | 5/2018 | Krishnaswamy | H04L 63/0861 |
| 2018/0232511 A1 | 8/2018 | Bakish | |
| 2018/0239955 A1* | 8/2018 | Rodriguez | G06K 9/0061 |
| 2018/0240463 A1 | 8/2018 | Perotti | |
| 2018/0254046 A1 | 9/2018 | Khoury et al. | |
| 2018/0336901 A1 | 11/2018 | Masaki et al. | |
| 2018/0374487 A1 | 12/2018 | Lesso | |
| 2019/0005963 A1 | 1/2019 | Alonso et al. | |
| 2019/0005964 A1 | 1/2019 | Alonso et al. | |
| 2019/0013033 A1 | 1/2019 | Bhimanaik et al. | |
| 2019/0114496 A1 | 4/2019 | Lesso | |
| 2019/0114497 A1 | 4/2019 | Lesso | |
| 2019/0115030 A1 | 4/2019 | Lesso | |
| 2019/0115032 A1 | 4/2019 | Lesso | |
| 2019/0115033 A1 | 4/2019 | Lesso | |
| 2019/0115046 A1 | 4/2019 | Lesso | |
| 2019/0147888 A1 | 5/2019 | Lesso | |
| 2019/0149932 A1 | 5/2019 | Lesso | |
| 2019/0228778 A1 | 7/2019 | Lesso | |
| 2019/0228779 A1 | 7/2019 | Lesso | |
| 2019/0306594 A1 | 10/2019 | Aumer et al. | |

FOREIGN PATENT DOCUMENTS

| | | |
|---|---|---|
| CN | 106531172 A | 3/2017 |
| EP | 1205884 A2 | 5/2002 |
| EP | 1701587 A2 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| GB | 2375205 A | 11/2002 |
| GB | 2499781 A | 9/2013 |
| GB | 2515527 A | 12/2014 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A1 | 4/2017 |
| WO | 2017203484 A1 | 11/2017 |

OTHER PUBLICATIONS

International Search Report and Written Opinion of the International Searching Authority, International Application No. PCT/GB2018/053274, dated Jan. 24, 2019.

Beigi, Homayoon, "Fundamentals of Speaker Recognition," Chapters 8-10, ISBN: 978-0-378-77592-0; 2011.

Li, Lantian et al., "A Study on Replay Attack and Anti-Spoofing for Automatic Speaker Verification", Interspeech 2017, Jan. 1, 2017, pp. 92-96.

Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.

(56) References Cited

OTHER PUBLICATIONS

Partial International Search Report of the International Searching Authority, International Application No. PCT/GB2018/052905, dated Jan. 25, 2019.
Combined Search and Examination Report, UKIPO, Application No. GB1713699.5, dated Feb. 21, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
International Search Report and Written Opinion of the International Searching Authority, International Application No. PCT/GB2018/052907, dated Jan. 15, 2019.
Ajmera, et al,, "Robust Speaker Change Detection," IEEE Signal Processing Letters, vol. 11, No. 8, pp. 649-651, Aug. 2004.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
Further Search Report under Sections 17 (6), UKIPO, Application No. GB1719731.0, dated Nov. 26, 2018.
Combined Search and Examination Report, UKIPO, Application No. GB1713697.9, dated Feb. 20, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
Chen et al., "You Can Hear But You Cannot Steal: Defending Against Voice Impersonation Attacks on Smartphones", Proceedings of the International Conference on Distributed Computing Systems, PD: 20170605.
Combined Search and Examination Report under Sections 17 and 18(3), UKIPO, Application No. GB1809474.8, dated Jul. 23, 2018.
International Search Report and Written Opinion of the International Searching Authority, International Application No. PCT/GB2019/050185, dated Apr. 2, 2019.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lucas, Jim, What is Electromagnetic Radiation?, Mar. 13, 2015, Live Science, https://www.livescience.com/38169-electromagnetism.html, pp. 1-11 (Year: 2015).

\* cited by examiner

DETECTION OF REPLAY ATTACK

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrolment phase. In subsequent use, the system is able to discriminate between the enrolled user and nonregistered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack, the method comprising:
 receiving an audio signal representing speech;
 identifying speech content present in at least a portion of the audio signal;
 obtaining information about a frequency spectrum of each portion of the audio signal for which speech content is identified;
 for each portion of the audio signal for which speech content is identified, retrieving information about an expected frequency spectrum of the audio signal;
 comparing the frequency spectrum of portions of the audio signal for which speech content is identified with the respective expected frequency spectrum; and
 determining that the audio signal may result from a replay attack if a measure of a difference between the frequency spectrum of the portions of the audio signal for which speech content is identified and the respective expected frequency spectrum exceeds a threshold level.

The method may further comprise:
 removing effects of a channel and/or noise from the received audio signal; and
 using the audio signal after removing the effects of the channel and/or noise when obtaining the information about the frequency spectrum of each portion of the audio signal for which speech content is identified.

Identifying speech content present in at least a portion of the audio signal may comprise identifying at least one test acoustic class. The at least one test acoustic class may comprise one or more specific phonemes. The at least one test acoustic class may comprise fricatives, especially sibilants; and/or may comprise plosives.

Identifying at least one test acoustic class may comprise identifying a location of occurrences of the test acoustic class in known speech content. The known speech content may comprise a pass phrase.

Comparing the frequency spectrum of portions of the audio signal for which speech content is identified with the respective expected frequency spectrum may comprise:
 comparing the frequency spectrum of portions of the audio signal for which speech content is identified with the respective expected frequency spectrum in a frequency band in the range of 5 kHz-20 kHz.

Comparing the frequency spectrum of portions of the audio signal for which speech content is identified with the respective expected frequency spectrum may comprise:
 comparing the frequency spectrum of portions of the audio signal for which speech content is identified with the respective expected frequency spectrum in a frequency band in the range of 20 Hz-200 Hz.

Comparing the frequency spectrum of portions of the audio signal for which speech content is identified with the respective expected frequency spectrum may comprise:
 comparing the frequency spectrum of portions of the audio signal for which speech content is identified with the respective expected frequency spectrum in an ultrasonic frequency band.

Comparing the identified parts of the audio signal with the respective retrieved information for the corresponding test acoustic class may comprise:
 comparing a power level in at least one frequency band of the identified parts of the audio signal with a power level in at least one corresponding frequency band of the expected spectrum of the audio signal.

The measure of the difference between the identified parts of the audio signal and the respective retrieved information for the corresponding test acoustic class may comprise a difference in power of greater than 1 dB.

The method may further comprise:
 performing a speaker identification process on the received audio signal; and
 for each test acoustic class, retrieving information about an expected spectrum of the audio signal for a speaker identified by said speaker identification process.

According to another aspect of the invention, there is provided a system for detecting a replay attack, the system comprising:
 an input, for receiving an audio signal representing speech; and
 a processor, wherein the processor is configured for:
 identifying speech content present in at least a portion of the audio signal;
 obtaining information about a frequency spectrum of each portion of the audio signal for which speech content is identified;
 for each portion of the audio signal for which speech content is identified, retrieving information about an expected frequency spectrum of the audio signal;
 comparing the frequency spectrum of portions of the audio signal for which speech content is identified with the respective expected frequency spectrum; and
 determining that the audio signal may result from a replay attack if a measure of a difference between the frequency spectrum of the portions of the audio signal for which speech content is identified and the respective expected frequency spectrum exceeds a threshold level.

There is also provided a device comprising such a system, wherein the device comprises one of: a smartphone, a tablet or laptop computer, a games console, a home control system, a home entertainment system, an in-vehicle entertainment system, or a domestic appliance.

According to a further aspect of the invention, there is provided a computer program product, comprising a tangible computer-readable medium, storing code for causing a suitable programmed processor to perform the method of the first aspect.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
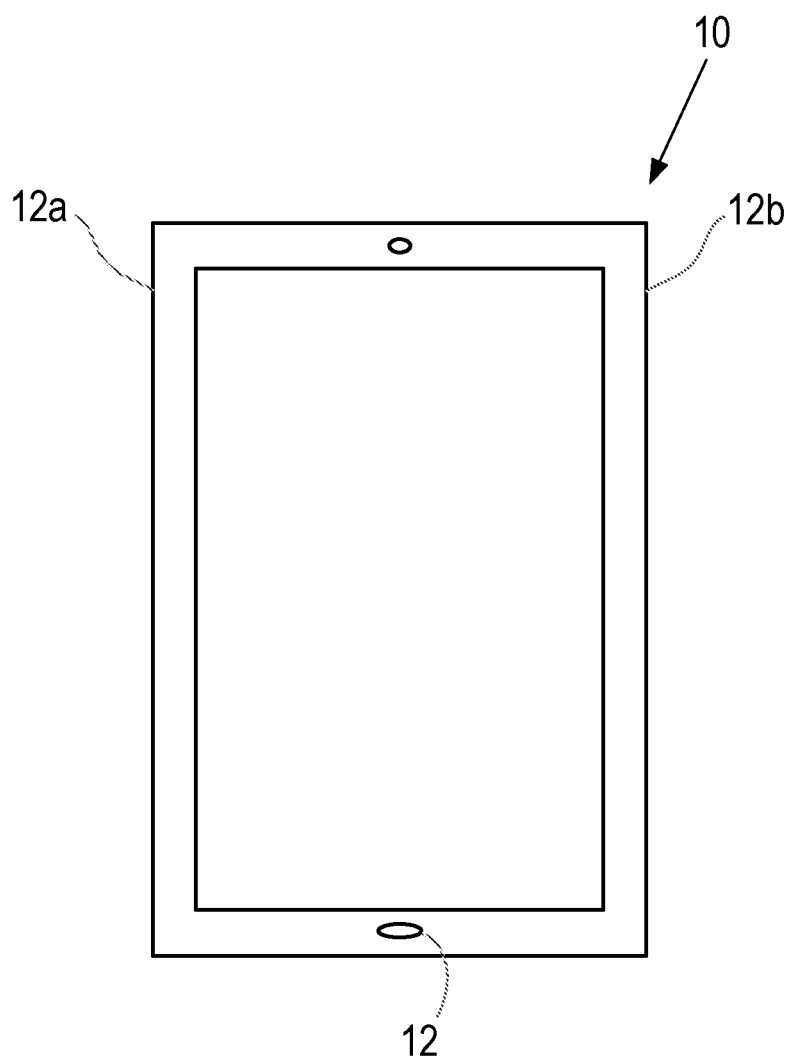
FIG. 1 illustrates a smartphone.

FIG. 1 illustrates a smartphone 10, having microphones 12, 12a, and 12b for detecting ambient sounds. In this example, the microphone 12 is of course used for detecting the speech of a user who is holding the smartphone 10, while the microphones 12a, 12b are provided on the upper part of the sides of the smartphone 10, and are therefore not clearly visible in FIG. 1.

The smartphone 10 is just one example of an electronic device in which the methods described herein can be performed. The methods can similarly be performed in another portable electronic device, such as a tablet or laptop computer, a games console, a home control system, a home entertainment system, an in-vehicle entertainment system, or a domestic appliance.

Figure 2:
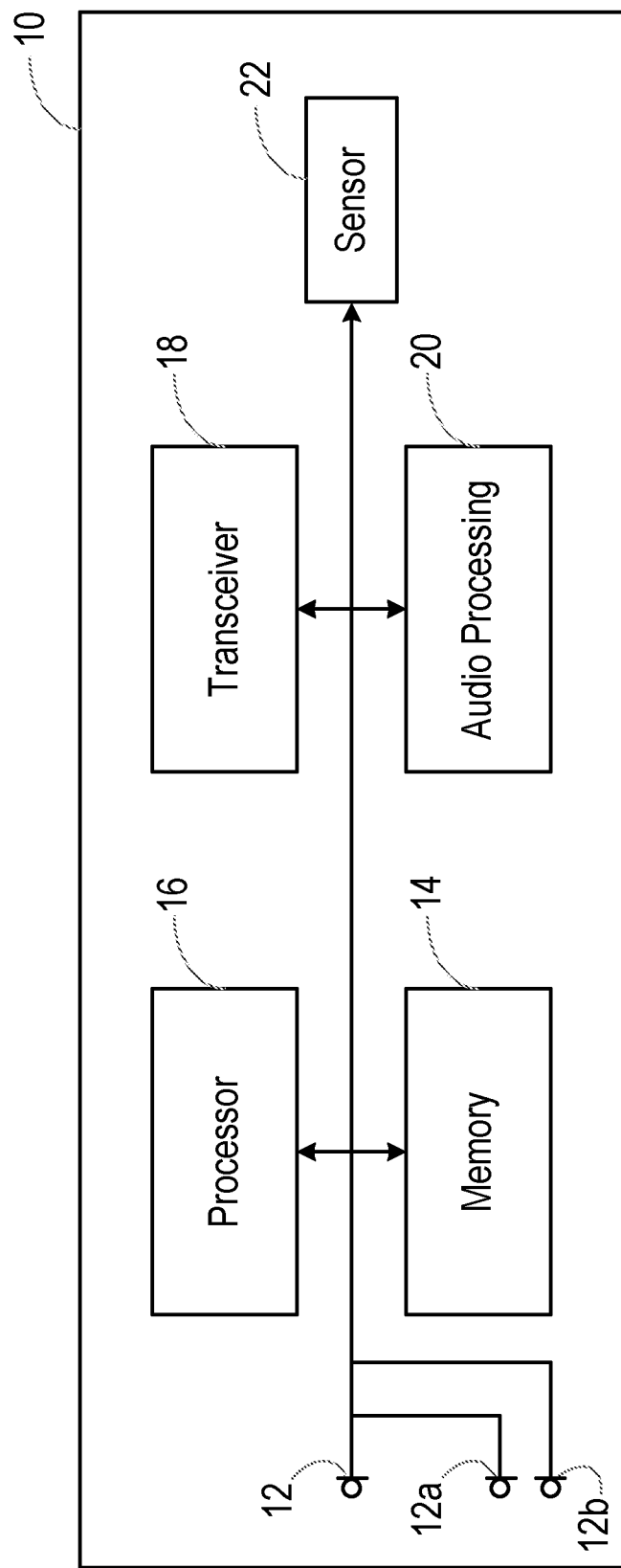
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

FIG. 2 also shows at least one sensor 22. In embodiments of the present invention, the sensor is a magnetic field sensor for detecting a magnetic field. For example, the sensor 22 may be a Hall effect sensor, that is able to provide separate measurements of the magnet field strength in three orthogonal directions. Further examples of sensors which may be used may comprise gyro sensors, accelerometers, or software based sensors operable to determine phone orientation, wherein such software-based sensors may operate in combination with software programs such as such as the FaceTime™ system provided by Apple, Inc.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device. In other embodiments, the speech recognition system is also provided on the smartphone 10.

One attempt to deceive a voice biometric system is to play a recording of an enrolled user's voice in a so-called replay or spoof attack.

Figure 3:
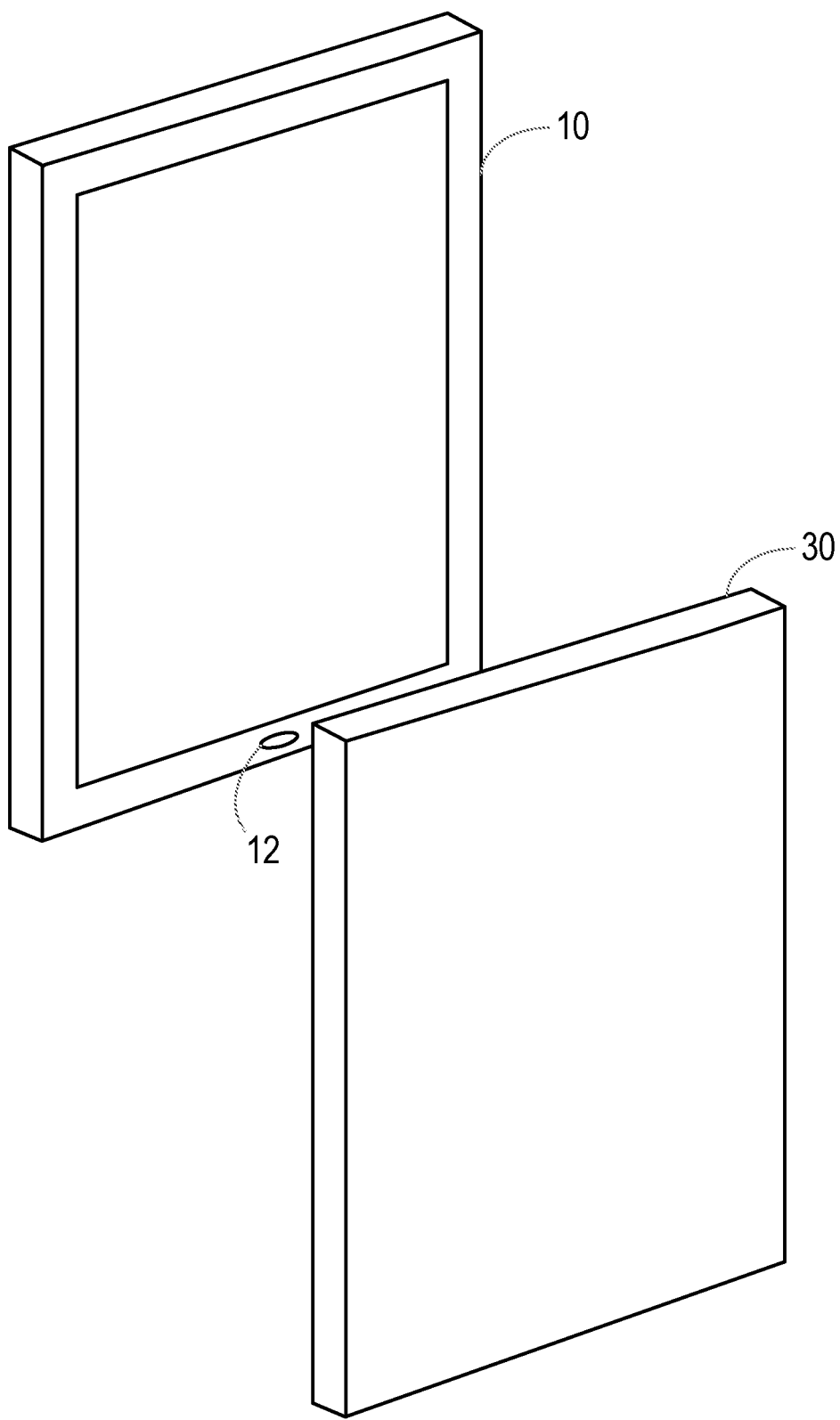
FIG. 3 shows an example of a situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency characteristics, and if these frequency characteristics can be detected in a speech signal that is received by the voice biometrics system, it may be considered that the speech signal has resulted from a replay attack.

For example, at frequencies below a lower threshold frequency, a loudspeaker may suffer from low-frequency roll-off, as the bass response is limited by the size of the loudspeaker diaphragm. The lower threshold frequency may be 200 Hz. In another example, at frequencies above an upper threshold frequency, a loudspeaker may suffer from high-frequency roll-off. Although good quality audio recording equipment, amplifiers, loudspeakers, etc. are designed to present very high fidelity in the audible frequency range (for example up to about 20 kHz), even high quality audio systems typically present a high attenuation in their frequency response above about 20 kHz. The average human being cannot perceive sounds in this frequency range, and so it is not usually worthwhile for system designers to provide high-fidelity recording and reproduction of such sounds.

The size of these effects will be determined by the quality of the loudspeaker. For example, in a high quality loudspeaker, the lower threshold frequency and the upper threshold frequency should be such that there is minimal low-frequency roll-off or high-frequency roll-off within the frequency range that is typically audible to humans. However, size and cost constraints mean that many commercially available loudspeakers, such as those provided in smartphones such as the smartphone 30, do suffer from these effects to some extent.

Thus, a loudspeaker may be unable to reproduce ultrasonic and/or near ultrasonic frequencies well. In these circumstances, if the ultrasonic and/or near ultrasonic frequency components of a detected speech signal are not at a power level which may be expected for "typical" speech, this may indicate that the detected speech signal resulted from a replay attack.

However, not all speech contains the same level of ultrasonic and/or near ultrasonic frequency components. For example, some groups of consonants such as fricatives and plosives contain relatively high levels of ultrasonic and near ultrasonic frequencies.

If a detected speech signal relates to speech that contains higher than normal amounts of speech in an acoustic class (or classes) such as these, which comprise relatively large components of ultrasonic and/or near ultrasonic frequencies, then, in the result of a replay attack through a loudspeaker that reduces the level of the ultrasonic and/or near ultrasonic frequency components, the ultrasonic and/or near ultrasonic frequencies in the detected speech signal may still be present at a power level that is similar to the power level that would be excepted for these frequencies in "typical" speech. Thus, in this situation, the system may not recognise that the speech signal may have resulted from a replay attack.

If the acoustic class of a detected speech signal, and the expected frequency characteristics of said acoustic class, can be determined, then the frequency characteristics of the detected speech signal may be able to be used to more reliably determine if the detected signal may have resulted from a replay attack.

Figure 4:
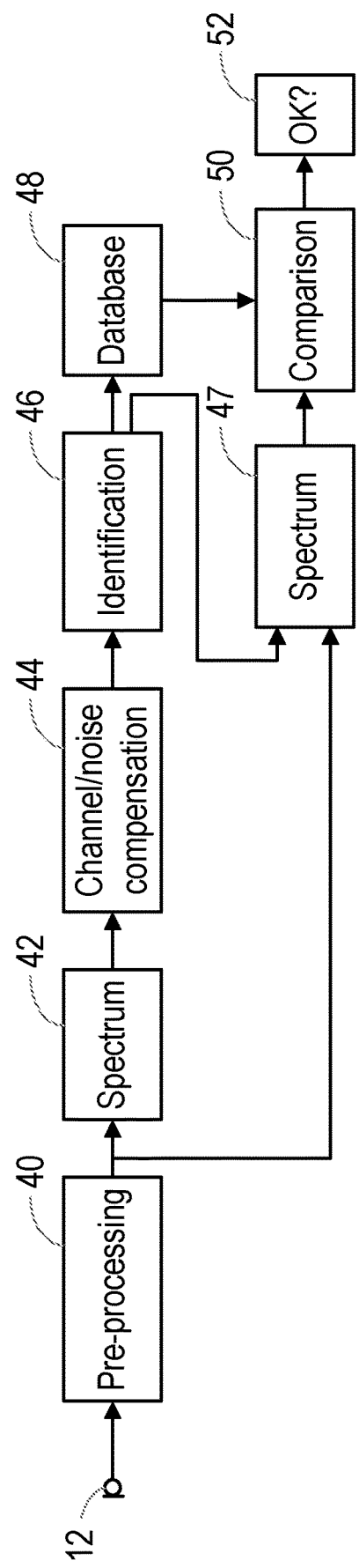
FIG. 4 is a block diagram illustrating the functional blocks in a voice biometrics system.
Figure 5:
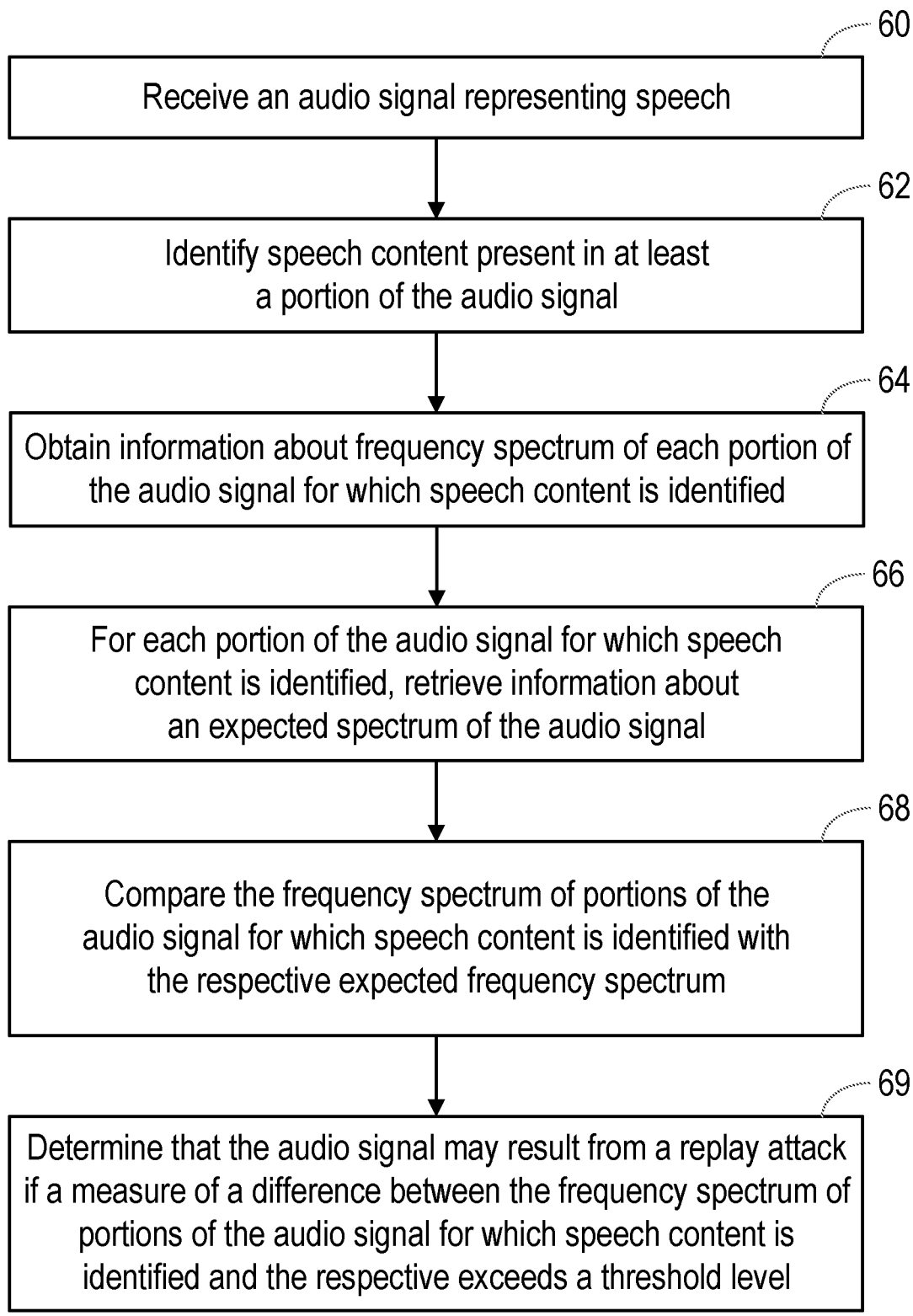
FIG. 5 is a flow chart, illustrating a method of detecting a replay attack on the voice biometrics system.

FIG. 4 is a block diagram illustrating the functional blocks in a voice biometrics system, and FIG. 5 is a flow chart, illustrating a method of detecting a replay attack on the voice biometrics system.

As shown in FIG. 4, a microphone 12 (for example one of the microphones in the smartphone 10) detects a sound, and this is passed to an initial processing block 40. The microphone 12 is capable of detecting audible sounds and sounds in the ultrasound range. As used herein, the term "ultrasound" (and "ultrasonic") refers to sounds in the upper part of the audible frequency range, and above the audible frequency range. Thus, the term "ultrasound" (and "ultrasonic") refers to sounds at frequencies above about 15 kHz.

The initial processing block 40 may for example include an analog-to-digital converter, for converting signals received from an analog microphone into digital form, and may also include a buffer, for storing signals. The analog-to-digital conversion involves sampling the received signal at a sampling rate. The sampling rate must be chosen to be high enough that any frequency components of interest are retained in the digital signal. For example, as described in more detail below, some embodiments of the invention involve looking at ultrasonic components of the received signal, for example in the region of 20-30 kHz. As is well known from the Nyquist sampling theorem, the sampling rate of a digital signal need to be at least twice the highest frequency component of the signal. Thus, in order to properly sample a signal containing components at frequencies up to 30 kHz, the sampling rate needs to be at least 60 kHz.

A typical smartphone may be capable of sampling at a sample rate of up to 192 kHz (which is high enough to provide a 96 kHz bandwidth), and so the sampling rate can be set to any suitable value that accommodates the intended frequency components.

As is conventional, the signal may be divided into frames, for example of 10-100 ms duration.

Thus, in step 60 in the method of FIG. 5, an audio signal representing speech is received.

The received audio signal representing speech may then be passed to a spectrum extraction block 42. The spectrum extraction block 42 may be configured to obtain a spectrum of the received audio signal. In some examples, the spectrum extraction block 42 may be configured to obtain a power spectrum of the received audio signal, while, in some other examples, the spectrum extraction block 42 may be configured to obtain an energy spectrum of the received audio signal.

In some examples, the spectrum extraction block 42 may be configured to perform a fast Fourier transform on the received audio signal. The result of the fast Fourier transform is an indication of the power or energy present in the signal at different frequencies.

In another example, the spectrum extraction block 42 may be configured to apply several band-pass filters to the received audio signal representing speech. Each band-pass filter may only allow signals within a particular frequency band of the received audio signal to pass through.

The received audio signal representing speech, and the spectrum obtained by the spectrum extraction block 42, may then be passed to a channel/noise compensation block 44. As will be appreciated, the received audio signal representing speech may be affected by properties of the channel (which we take to mean any factor that produces a difference between the user's speech and the speech signal as generated by the microphone alters). The received audio signal representing speech may also be affected by noise. The channel/noise compensation block 44 may be configured to remove the effects of a channel and/or noise from the received audio signal representing speech, to obtain a cleaned received audio signal representing speech.

An example embodiment of the channel/noise compensation block 44 is described in greater detail below.

Figure 6:
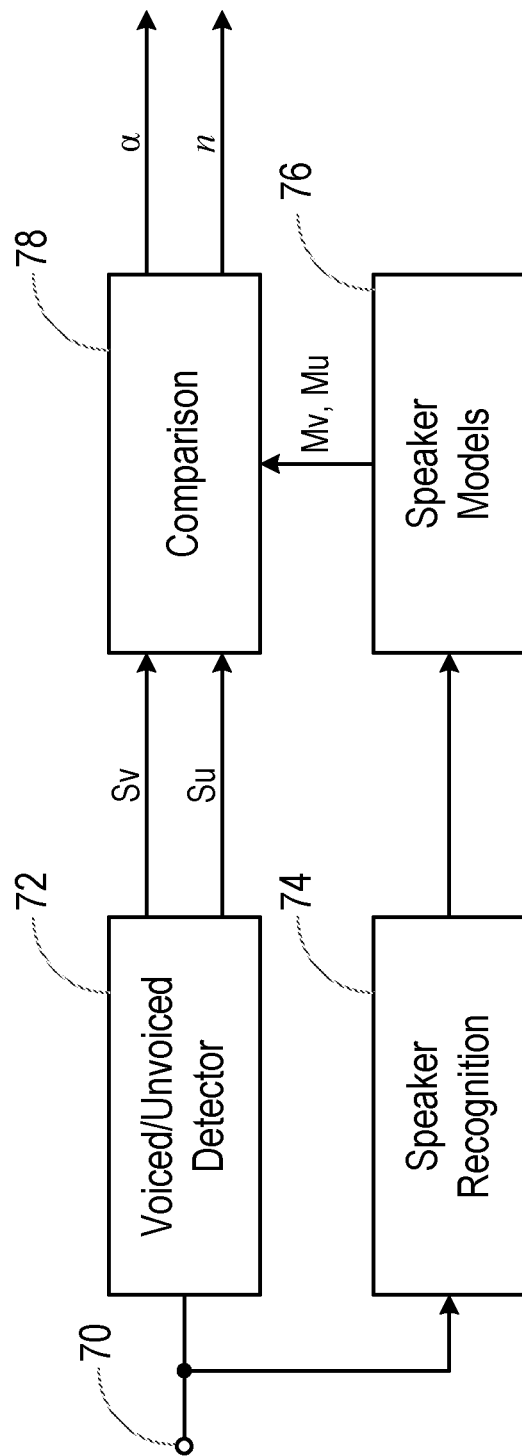
FIG. 6 illustrates a part of the system of FIG. 4.

Specifically, FIG. 6 shows a channel/noise compensation system, which is described in more detail in UK Patent Application No. 1719734.4.

In FIG. 6, the signal received on an input 70 is passed to a voiced/unvoiced detection block 72, which determines when the received signal represents voiced speech, and when it represents unvoiced speech. The voiced/unvoiced detection block 72 thus outputs the first component of the audio signal, Sv, representing voiced speech and the second component, Su, representing unvoiced speech. More specifically, in some embodiments, the first component of the audio signal, Sv, representing voiced speech and the second component, Su, representing unvoiced speech, are averaged spectra of the voiced and unvoiced components of the speech. By averaged spectra are meant spectra of the speech obtained and averaged over multiple frames.

The signal received on the input 70 is also passed to a speaker recognition block 74, which performs a voice biometric process to identify the speaker, from amongst a plurality of enrolled speakers. The process of enrolment in a speaker recognition system typically involves the speaker providing a sample of speech, from which specific features are extracted, and the extracted features are used to form a model of the speaker's speech. In use, corresponding features are extracted from a sample of speech, and these are compared with the previously obtained model to obtain a measure of the likelihood that the speaker is the previously enrolled speaker.

In the system shown in FIG. 6, one or more speaker model is stored, for example in a database 76. Based on the output of the speaker recognition block 74, one or more speaker model is selected. In this embodiment, each speaker model contains separate models of the voiced speech and the unvoiced speech of the enrolled user. More specifically, the model of the voiced speech and the model of the unvoiced speech of the enrolled user each comprise amplitude values corresponding to multiple frequencies.

Thus, the model of the voiced speech may be indicated as Mv, where Mv represents a vector comprising one amplitude value at each of the selected frequencies, while the model of the unvoiced speech may be indicated as Mu, where Mu represents a vector comprising one amplitude value at each of the selected frequencies.

As will be appreciated, the received signal, containing the user's speech, will be affected by the properties of the channel, which we take to mean any factor that produces a difference between the user's speech and the speech signal as generated by the microphone alters, and the received signal will also be affected by noise.

Thus, assuming that the channel and the noise are constant over the period during which the received signal is averaged to form the first and second components of the received speech, these first and second components can be expressed as:

$$Sv = \alpha \cdot Mv + n, \text{ and}$$

$$Su = \alpha \cdot Mu + n,$$

where

α represents the frequency spectrum of a multiplicative disturbance component, referred to herein as the channel, and n represents the frequency spectrum of an additive disturbance component, referred to herein as the noise.

Thus, with measurements Sv and Su, and with models Mv and Mu, these two equations can therefore be solved in a comparison block 78 for the two unknowns, α and n.

Thus, for illustrative purposes, $$\alpha = \frac{(Su - Sv)}{(Mu - Mv)}, \text{ and}$$

$$n = \frac{(SuMv - SvMu)}{(Mu - Mv)}.$$

For completeness, it should be noted that, with measurements of the spectrum made at a plurality of frequencies, these two equations are effectively solved at each of the frequencies.

Alternatively, with measurements made at f different frequencies, the equations $Sv = \alpha \cdot Mv + n$, and $Su = \alpha \cdot Mu + n$ can each be regarded as f different equations to be solved.

In that case, having solved the equations, it may be useful to apply a low-pass filter, or a statistical filter such as a Savitsky-Golay filter, to the results in order to obtain low-pass filtered versions of the channel and noise characteristics.

As an alternative example, a least squares method may be used to obtain solutions to the 2f different equations.

Thus, information is obtained about the channel and/or the noise affecting the audio signal.

Although one possible embodiment of the channel/noise compensation block 44 has been described above, it will be appreciated that the channel/noise compensation block 44 may be configured to perform any suitable method to remove effects of a channel and/or noise from the received audio signal.

In addition, although the system as illustrated in FIG. 4 comprises a channel/noise compensation block 44 (and it is the audio signal after removing the effects of the channel and/or noise that is used subsequently, as described below), it will be appreciated that this is optional and the received audio signal may be used without removing effects of the channel and/or noise from the received audio signal. In particular, this may be done in a situation where it is known that the channel is approximately ideal, or where it is known that the system is in an environment in which there is a low level of background noise.

The effects of the channel and/or noise can then be removed from the input signal, and the output of the channel/noise compensation block 44 may then be passed to an identification block 46. The identification block 46 may be configured to identify speech content present in at least a portion of the received audio signal. Typically, this involves more than simply detecting the presence of human speech, but means identifying specific speech content. In some embodiments, the identification block 46 is configured to identify at least one test acoustic class in the received audio signal, where an acoustic class is the set of phonemes belonging to the same broad class of phonemes, such as fricatives, vowels, etc. That is, the identification block 46 may be configured to identify the portions of the received audio signal that contain one or more specific test acoustic class.

The at least one test acoustic class may be an acoustic class that comprises certain spectral properties. In other words, the at least one test acoustic class may be chosen to provide a particular power distribution across a particular range of frequencies. For example, the at least one acoustic class may comprise a relatively high level of ultrasonic and/or near ultrasonic frequencies.

In some examples, the at least one test acoustic class may comprise one or more specific phonemes. In some examples, the test acoustic class may comprise a set of vowels. In other examples, the test acoustic class may comprise a set of consonants. For example, the at least one test acoustic class may comprise fricatives, and more specifically may comprise sibilants. In another example, the at least one test acoustic class may comprise plosives. It is noted that an audio signal generated by the vocal tract of a human being, in particular when articulating fricatives and sibilant phonemes, contains significant energy in the ultrasound region, above about 20 kHz, and even beyond 30 kHz.

The identification block 46 may be configured to identify parts of the audio signal representing at least one test acoustic class. In some examples, the identification block 46 may be configured to identify parts of the audio signal representing one test acoustic class, out of a plurality of preselected test acoustic classes. In some examples, the identification block 46 may determine the test acoustic class that the received audio signal corresponds to on a frame-by-frame basis. For example, the identification block 46 may determine that a first group of received frames corresponds to a phoneme in the fricative class, and that a second group of received frames corresponds to a phoneme in the plosive class.

The identification of the acoustic class may for example be performed by a trained neural network.

In some examples, the identification block 46 includes or is associated with an automatic speech recognition block, which can identify the speech content present in at least a portion of the received audio signal. Having identified the speech content, the identification block 46 can for example then identify the portions of the received audio signal that contain the one or more specific test acoustic class.

For example, in some embodiments of the method, when applied in a smartphone, smart speaker, or the like, the smartphone or smart speaker is activated by an enrolled user speaking a predetermined pass phrase, and so the device is able to recognise an audio signal that contains the pass phrase. For example, the pass phrase may be "Hi assistant".

The vowel sound in the word "Hi" naturally contains higher frequency components than many vowels. Similarly, the sibilant consonants contain a relatively large amount of high frequency components. The result is that the identification block 46 can determine which portion of the audio signal containing the pass phrase, i.e. which frames of the audio signal, will contain the phonemes with a high proportion of high frequency components. In effect, a map of the temporal positions of the fricative and/or sibilant phonemes within the pass phrase can be created. Thus, the specific speech content in these portions of the audio signal can be identified.

For example, if the pass phrase occupies 1 second of the audio signal, the frames containing the vowel sound in the word "Hi" may appear in the portion of the audio signal between, say, 50-150 milliseconds into the audio signal. Similarly, the sibilant consonants in the word "assistant" may appear in the portion of the audio signal between, say, 550-850 milliseconds into the audio signal.

The frames appearing during these time intervals may therefore be identified.

Thus, in step 62 in the method of FIG. 5, the speech content present in at least a portion of the audio signal is identified.

In the example as illustrated in FIG. 4, the output of the channel/noise compensation block 44 is passed to the identification block 46. However, it will be appreciated that the received audio signal representing speech may be passed to the identification block 46 without any processing having been previously performed to remove effects of the channel and/or noise. This may occur in a situation where it is known that the channel is approximately ideal, or this may occur in a situation where it is known that the system is in an environment in which there is very low level of background noise.

In the example as illustrated in FIG. 4, an extracted spectrum is passed to the identification block 46. However, it will be appreciated that the identification block 46 may receive the received audio signal representing speech in an unprocessed form, or a form that remains in the time domain (as opposed to in the frequency domain), and identify the speech content present in at least a portion of the audio signal (for example identifying the at least one acoustic class) from this form of the received audio signal. A suitably trained neural network may be used for this identification.

Having identified the speech content, information is obtained about a frequency spectrum of each portion of the audio signal for which the specific speech content is identified. For example, whereas the spectrum extraction block 42 may be configured to obtain a spectrum of the entire received audio signal, a second spectrum extraction block 47 may be configured to obtain a spectrum of those portions of the received audio signal for which the particular speech content of interest is identified. For example, as described above, the portions of the signal representing the specific speech content with a high proportion of high frequency components may be considered of interest, and the second spectrum extraction block 47 may be configured to obtain a spectrum of the frames of the received audio in which that speech content is identified.

The identification block 46 may transmit an indication of the identified speech content to a database 48. The database 48 may receive the indication of the identified speech content, and supply corresponding stored information about an expected spectrum of the audio signal. For example, where the relevant speech content comprises one or more specific acoustic class, for example one or more phonemes, the database 48 may be configured to store, for each acoustic class, an expected power spectrum of the audio signal that corresponds to that acoustic class. The database 48 may then be configured, for each acoustic class, to retrieve an expected energy spectrum of the audio signal that corresponds to that acoustic class.

Thus, in step 66 in the method of FIG. 5, for each portion of the audio signal for which speech content is identified, information about an expected frequency spectrum of the corresponding portion of the audio signal is retrieved.

The database 48 may transmit, for each portion of the audio signal for which speech content is identified (that is, for example, for each identified test acoustic class), the retrieved information about an expected spectrum of the audio signal to a comparison block 50.

The comparison block 50 may also receive the spectrum of the frames of the received audio signal in which that same speech content is identified, (for example the or each spectrum of the frames containing the at least one test acoustic class), from the second spectrum extraction block 47.

The comparison block 50 may then compare the received identified parts of the audio signal (representing the at least one test acoustic class) with the received respective retrieved information for the corresponding test acoustic class.

In some examples, the comparison block 50 may compare components of the identified parts of the audio signal with the respective retrieved information for the corresponding test acoustic class in a frequency band in the range of 5-20 kHz, or in the range from 16 kHz upwards. As described above, some loudspeakers may be unable to reproduce ultrasonic and/or near ultrasonic frequencies well. As a result of this, a received audio signal that comprises a test acoustic class which comprises a relatively high level of ultrasonic and/or near ultrasonic frequencies is likely to be reproduced poorly by a loudspeaker at these frequencies (for example, in a frequency band in the range of 5 kHz-20 kHz, or in a frequency band in the range above 16 kHz). Thus, the spectrum of a received audio signal representing a test acoustic class is likely to differ significantly from the expected spectrum of an audio signal representing a test acoustic class, wherein the test acoustic class comprises a relatively high level of ultrasonic and/or near ultrasonic frequencies, when the received audio signal results from a replay attack. Thus, in order to be able to detect a replay attack using this frequency band, it is preferable for the test acoustic class to comprise a relatively high level of ultrasonic and/or near ultrasonic frequencies, and suitable acoustic classes may for example be fricatives, such as sibilants, and plosives.

In some examples, the comparison block 50 may compare components of the identified parts of the audio signal with the respective retrieved information for the corresponding test acoustic class in a frequency band of 20-200 Hz. Some loudspeakers may be unable to reproduce lower frequencies (for example, frequencies in the band of 20-200 Hz) well. As a result of this, a test acoustic class which comprises a relatively high level of these frequencies is likely to be reproduced poorly by a loudspeaker at these frequencies. Thus, the spectrum of a received audio signal representing a test acoustic class is likely to differ significantly from the expected spectrum of an audio signal representing a test acoustic class, wherein the test acoustic class comprises a relatively high level of these lower frequency components, when the received audio signal results from a replay attack. Thus, in order to be able to detect a replay attack using this frequency band, it is preferable for the test acoustic class to comprise a relatively high level of frequencies in the band of 20-200 Hz, and suitable acoustic classes may for example be certain vowel sounds. For example, the high back and near-high back rounded vowels represented in the International Phonetic Alphabet by <u> and <ʊ> respectively have high levels of these low frequency components.

The high front unrounded vowel represented in the International Phonetic Alphabet by <i> typically has a relatively low first formant frequency F1 and a relatively high second formant frequency F2, and so portions of speech that contain this vowel sound have relatively high levels of low frequencies in the 20-200 Hz band and of high frequencies in the 5 kHz-20 kHz band. Therefore, if portions of speech that contain this vowel sound are identified, it is useful to compare the frequency spectrum of those portions with the expected frequency spectrum in respective frequency bands in both the 20-200 Hz range and the 5 kHz-20 kHz range.

In some examples, the comparison block 50 may compare a spectrum of the identified parts of the audio signal with a retrieved expected spectrum for the corresponding test acoustic class.

In one example, the comparison block 50 may compare the identified parts of the audio signal, where said identified parts of the audio signal have been obtained from a FFT performed on the audio signal received at the spectrum block 42, with a respective retrieved spectrum for the corresponding test acoustic class. In another example, the comparison block 50 may compare the identified parts of the audio signal, where said identified parts of the audio signal have been obtained from the band-passed audio signal as generated by the spectrum block 42, with a respective retrieved spectrum for the corresponding test acoustic class.

In some examples, the comparison block 50 may compare a power level in at least one frequency band of the identified parts of the audio signal with a power level in at least one corresponding frequency band of the expected spectrum of the audio signal. In this example, the measure of the difference between the identified parts of the audio signal and the respective retrieved information for the corresponding test acoustic class may comprise a difference in power.

As explained above, a difference in the power level of the identified parts of the audio signal at a particular frequency (or within a particular frequency range), when compared to the power level of the respective retrieved information for the corresponding test acoustic class at that frequency (or within that frequency range), may be indicative that the audio signal may result from a replay attack.

In some examples, the comparison block may compare a power level in a frequency band in which it may be assumed that a loudspeaker used for a replay attack will have a poor frequency response. The comparison block 50 may compare a power level in a frequency band in the range of 5 kHz-20 kHz of the identified parts of the audio signal with a power level in the same frequency band in the 5 kHz-20 kHz frequency range of the expected spectrum of the audio signal. In addition, or alternatively, the comparison block 50 may compare a power level in a frequency band in the range of 20 Hz-200 Hz of the identified parts of the audio signal with a power level in the same frequency band in the range of 20 Hz-200 Hz of the expected spectrum of the audio signal. In addition, or alternatively, the comparison block 50 may compare a power level in a frequency band in the range of 20 kHz-30 kHz of the identified parts of the audio signal with a power level in the same frequency band in the 20 kHz-30 kHz frequency range of the expected spectrum of the audio signal.

Thus, in step 68 of the method of FIG. 5, the frequency spectrum of portions of the audio signal for which speech content is identified is compared with the respective expected frequency spectrum.

The comparison as generated by the comparison block 50 may be transmitted to a decision block 52. The decision block 52 may determine if a measure of a difference between the frequency spectrum of portions of the audio signal for which speech content is identified and the respective expected frequency spectrum exceeds a threshold level. If the measure of the difference exceeds a threshold level, the decision block 52 may determine that the audio signal may result from a replay attack.

Thus, in step 69 of the method of FIG. 5, if a measure of a difference between the frequency spectrum of the portions of the audio signal for which speech content is identified and the respective expected frequency spectrum exceeds a threshold level, it is determined that the audio signal may result from a replay attack.

In some situations, it may be desirable in step 66 of the method to retrieve information about an expected spectrum that represents a specific test acoustic class, where that information is specific to an individual speaker (as opposed to obtaining a spectrum that is representative of the test acoustic class as spoken by a plurality of speakers).

Thus, in some embodiments, the system may perform a speaker identification process on the received audio signal. In some examples, the received audio signal representing speech may undergo a speaker identification process, prior to the retrieving of the information about an expected spectrum of the audio signal from the database 48. The speaker identification process may be performed prior to, or in parallel with, the first two steps of the method of FIG. 5. Methods of speaker identification will be well understood by a person skilled in the art.

Following the identification of the speaker who produced the received audio signal representing speech, the obtained speaker identity may also be passed to the database 48.

In some examples, the expected spectrum corresponding to each acoustic class stored in the database 48 will be representative of the acoustic class as spoken by a large cohort of speakers. However, in some examples, the expected spectrum corresponding to each acoustic class stored in the database 48 will be representative of the acoustic class as spoken by a particular individual. Said particular individual may have been identified by the speaker identification process.

Thus, for each test acoustic class, the database 48 may retrieve information about an expected spectrum of the audio signal for a speaker identified by said speaker identification process.

For example, there may be a plurality of users enrolled in a system, and each of these plurality of enrolled users may have a model corresponding to their speech stored within the database 48. For each enrolled user, the user's corresponding model may comprise information about an expected spectrum of the audio signal for a plurality of test acoustic classes for that user.

In an example where there are two users enrolled in a system, there may be information about two expected spectra for each test acoustic class stored within the database 48, where the first expected spectrum corresponds to the first enrolled user, and the second enrolled user corresponds to the second enrolled user. The speaker identification process may identify which of the two enrolled users produced the received audio signal representing speech. The identity of the speaker may then be used by the database 48 to retrieve information about the expected spectrum (for each identified test acoustic class in the audio signal) that corresponds to the identified speaker. This "speaker specific" retrieved information may then be passed to and used by the comparison block 50 in substantially the same manner as described above. As the retrieved information about an expected spectrum of the audio signal will be "speaker specific", it is likely that the comparison between the identified parts of the audio signal with the respective retrieved information for the corresponding test acoustic class will be more accurate (as both pieces of information being compared are now specific to that speaker). Thus, it is likely that a determination that the audio signal may result from a replay attack will be more accurate as a result.

Figure 7:
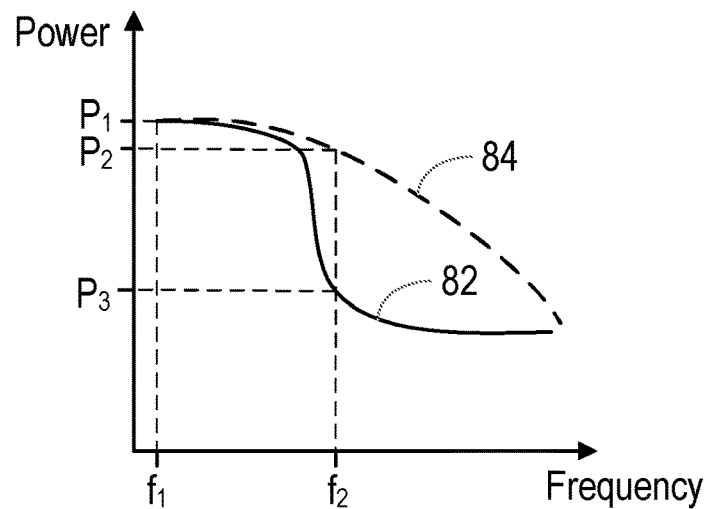
FIGS. 7-9 illustrate examples of comparisons between identified parts of the audio signal with the respective retrieved information for the corresponding test acoustic classes, in a number of situations in which the audio signal may have resulted from a replay attack.
Figure 8:
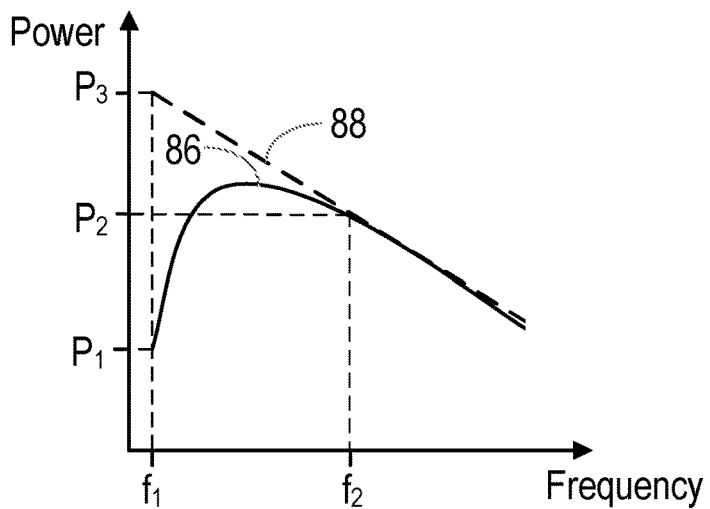
Figure 9:
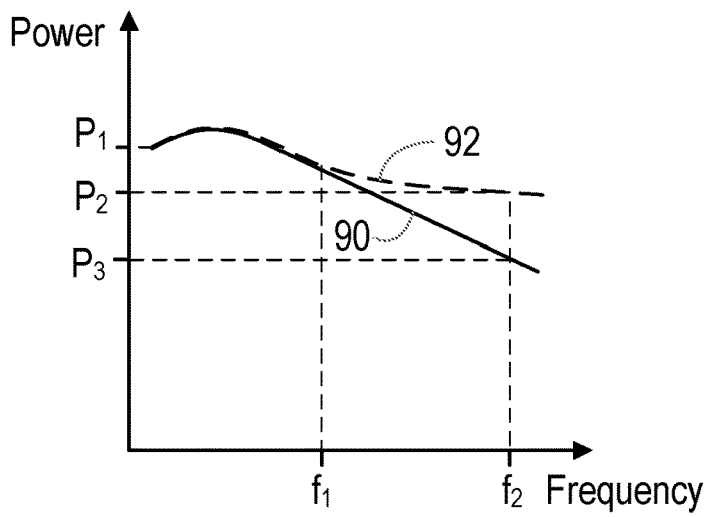

FIG. 7, FIG. 8 and FIG. 9 illustrate examples of comparisons between identified parts of the audio signal with the respective retrieved information for the corresponding test acoustic classes, in a number of situations in which the audio signal may have resulted from a replay attack. In the following examples, the identified parts of the audio signal representing at least one test acoustic class are power spectra, and the respective retrieved information for the corresponding test acoustic classes are also power spectra.

In FIG. 7, FIG. 8 and FIG. 9, the identified spectra of the received signals are indicated by solid lines, and the expected spectra that have been retrieved from the database are indicated by dashed lines.

In FIG. 7, it can be seen that, at a particular first frequency (as indicated by $f_1$), the identified spectrum 82 and the expected spectrum 84 have a substantially similar power level (as indicated by $P_1$). As the frequency increases, the expected spectrum and the identified spectrum continue to have a substantially similar power level until a particular second frequency is reached (as indicated by $f_2$). At this point, the expected spectrum 84 remains at a first power level (as indicated by $P_2$), whereas the power level of the identified spectrum 82 rolls-off to a different second power level (as indicated by $P_3$). This roll-off in power level at higher frequencies as seen in the identified spectrum 82, but not seen in the expected spectrum for that specific acoustic class, may be indicative that the received audio signal representing speech may have resulted from a replay attack.

For example, it may be determined that the received audio signal representing speech may have resulted from a replay attack if the power level decreases at a relatively constant rate, such as 6 dB per octave, for frequencies above an upper cut-off frequency. The upper cut-off frequency may be in the range 15-25 kHz.

In FIG. 8, it can be seen that at a particular first frequency (as indicated by $f_1$), the identified spectrum 86 and the expected spectrum 88 have significantly different power levels. The power level (as indicated by $P_1$) at $f_1$ for the identified spectrum 86 is significantly lower than the power level (as indicated by $P_3$) at $f_1$ for the expected spectrum 88. As the frequency increases, the power level of the identified spectrum gradually increases, until a second particular frequency (as indicated by $f_2$) is reached. At frequency $f_2$, the power levels of the identified spectrum 86 and the expected spectrum 88 (as indicated by $P_2$) are substantially the same. This "roll-off" in power level with decreasing frequency as seen in the identified spectrum, but not seen in the expected spectrum, may be indicative that the received audio signal representing speech may have resulted from a replay attack.

For example, it may be determined that the received audio signal representing speech may have resulted from a replay attack if the power level decreases at a relatively constant rate, such as 6 dB per octave, for frequencies below a lower cut-off frequency. The lower cut-off frequency may be in the range 20-200 Hz.

In FIG. 9, it can be seen that, at frequencies below a particular first frequency (as indicated by $f_1$), the power level of the identified spectrum 90 and the expected spectrum 92 is substantially the same (as indicated by $P_1$). As the frequency increases, the power level of the identified spectrum 90 begins to deviate from the power level of the expected spectrum 92. In this example, the power level of the expected spectrum begins to decrease with increasing frequency at a substantially faster rate than the power level of the identified spectrum. At a second particular frequency (as indicated by $f_2$), the power level of the identified spectrum 90 is at a significantly lower power level (as indicated by $P_3$) than the power level of the expected spectrum 92 (as indicated by $P_2$). This difference in absolute power level at a particular frequency between the identified spectrum and the expected spectrum may be indicative that the received audio signal representing speech may have resulted from a replay attack. In some examples, a difference in absolute power level that exceeds a threshold level may be indicative of a replay attack. For example, the threshold level may be 1 dB. Thus, this allows the identification of signals that may result from a replay attack in a more reliable way, by comparing signals from a known acoustic class with an expected spectrum that is specific to that same acoustic class.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack, the method comprising:
   receiving an audio signal representing speech;
   identifying speech content present in at least a portion of the audio signal;
   obtaining information about a frequency spectrum of each portion of the audio signal for which speech content is identified;
   for each portion of the audio signal for which speech content is identified, retrieving information about an expected frequency spectrum of the audio signal;
   comparing the frequency spectrum of portions of the audio signal for which speech content is identified with the respective expected frequency spectrum in one of a frequency band of 20-200 Hz and an ultrasonic frequency band; and
   determining that the audio signal results from a replay attack if a measure of a difference between the frequency spectrum of the portions of the audio signal for which speech content is identified and the respective expected frequency spectrum exceeds a threshold level.

2. A method according to claim 1, comprising:
   removing effects of a channel and/or noise from the received audio signal; and
   using the audio signal after removing the effects of the channel and/or noise when obtaining the information about the frequency spectrum of each portion of the audio signal for which speech content is identified.

3. A method according to claim 1, wherein identifying speech content present in at least a portion of the audio signal comprises identifying at least one test acoustic class.

4. A method according to claim 3, wherein the at least one test acoustic class comprises one or more specific phonemes.

5. A method according to claim 4, wherein the at least one test acoustic class comprises fricatives.

6. A method according to claim 5, wherein the at least one test acoustic class comprises sibilants.

7. A method according to claim 4, wherein the at least one test acoustic class comprises plosives.

8. A method according to claim 3, wherein identifying at least one test acoustic class comprises identifying a location of occurrences of the test acoustic class in known speech content.

9. A method according to claim 8, wherein the known speech content comprises a pass phrase.

10. A method according to claim 1, wherein comparing the frequency spectrum of portions of the audio signal for which speech content is identified with the respective expected frequency spectrum comprises:
    comparing the frequency spectrum of portions of the audio signal for which speech content is identified with the respective expected frequency spectrum in a frequency band in the range of 5-20 kHz.

11. A method according to claim 1, wherein comparing the identified parts of the audio signal with the respective retrieved information for the corresponding test acoustic class comprises:
    comparing a power level in at least one frequency band of the identified parts of the audio signal with a power level in at least one corresponding frequency band of the expected spectrum of the audio signal.

12. A method according to claim 11, wherein the measure of the difference between the identified parts of the audio signal and the respective retrieved information for the corresponding test acoustic class comprises a difference in power of greater than 1 dB.

13. A method according to claim 1, further comprising:
performing a speaker identification process on the received audio signal; and
for each test acoustic class, retrieving information about an expected spectrum of the audio signal for a speaker identified by said speaker identification process.

14. A system for detecting a replay attack, the system comprising:
an input, for receiving an audio signal representing speech; and
a processor, wherein the processor is configured for:
identifying speech content present in at least a portion of the audio signal;
obtaining information about a frequency spectrum of each portion of the audio signal for which speech content is identified;
for each portion of the audio signal for which speech content is identified, retrieving information about an expected frequency spectrum of the audio signal;
comparing the frequency spectrum of portions of the audio signal for which speech content is identified with the respective expected frequency spectrum in one of a frequency band of 20-200 Hz and an ultrasonic frequency band; and
determining that the audio signal results from a replay attack if a measure of a difference between the frequency spectrum of the portions of the audio signal for which speech content is identified and the respective expected frequency spectrum exceeds a threshold level.

15. A device comprising a system as claimed in claim 14, wherein the device comprises one of: a smartphone, a tablet or laptop computer, a games console, a home control system, a home entertainment system, an in-vehicle entertainment system, or a domestic appliance.

16. A computer program product, comprising a non-transitory computer-readable medium, storing code for causing a suitable programmed processor to perform a method as claimed in claim 1.

* * * * *